E. SCHNEIDER.
POWER BARRING APPARATUS.
APPLICATION FILED MAR. 31, 1919.

1,353,275.

Patented Sept. 21, 1920.
3 SHEETS—SHEET 1.

E. SCHNEIDER.
POWER BARRING APPARATUS.
APPLICATION FILED MAR. 31, 1919.

1,353,275.

Patented Sept. 21, 1920.
3 SHEETS—SHEET 2.

E. SCHNEIDER.
POWER BARRING APPARATUS.
APPLICATION FILED MAR. 31, 1919.

1,353,275.

Patented Sept. 21, 1920.
3 SHEETS—SHEET 3.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

POWER-BARRING APPARATUS.

1,353,275.   Specification of Letters Patent.   Patented Sept. 21, 1920.

Application filed March 31, 1919. Serial No. 286,500.

*To all whom it may concern:*

Be it known that I, EUGÈNE SCHNEIDER, citizen of the French Republic, and residing at 42 rue d'Anjou, Paris, France, have invented an Improved Power-Barring Apparatus, which invention is fully set forth in the following specification.

This invention has for its object to provide an improved power barring apparatus, that is to say, an apparatus for rotating slowly through fractions of a revolution, a shaft or line of shafting, for instance the shaft of a steam turbine, while the admission of motive fluid is shut off, for the purpose of inspection or repair.

The improved barring apparatus belongs to that class of such apparatus comprising a piston driven by pressure fluid for actuation of one of the elements of a spring ratchet gear, the other element being carried by the shaft which it is desired to rotate; the said ratchet gear being automatically rendered inoperative by an opposing spring immediately the pressure fluid ceases to act upon the said piston.

The essential characteristic feature of the improved apparatus consists in this that the ratchet element actuated by the piston, is formed on the free end of a sleeve surrounding the said piston and movable with the latter in the cylinder in which the pressure fluid acts. The longitudinal motion of the piston is converted into an advancing and rotational movement of the sleeve by means of tenons fixed on the piston and guided in rectilinear slots in the cylinder, being engaged at the same time in helical slots formed in the sleeve.

In one constructional form of the improved apparatus the ratchet element carried by the sleeve is constituted by teeth formed on the end or face of the said sleeve; the coöperating element of the ratchet gear being constituted by corresponding teeth formed on the end of the shaft to be rotated.

The invention comprises also a simple device for indicating the position of the toothed sleeve.

In the accompanying drawings which illustrate by way of example a constructional form of the improved apparatus:—

The improved apparatus comprises a cylinder A serving as a support or casing for the device, and fixed by means of bolts $b$ to the fixed part B of the apparatus. This cylinder is open at one end and closed at the other by a suitable head.

Figure 1:
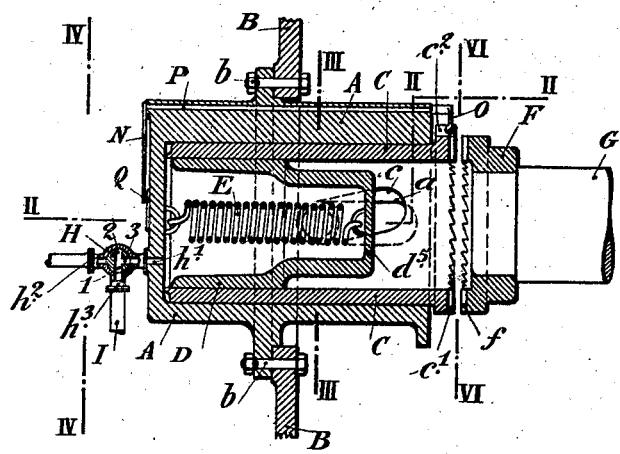
Figure 1 is a vertical longitudinal section of the improved apparatus, showing the same in its inoperative position.
Figure 2:
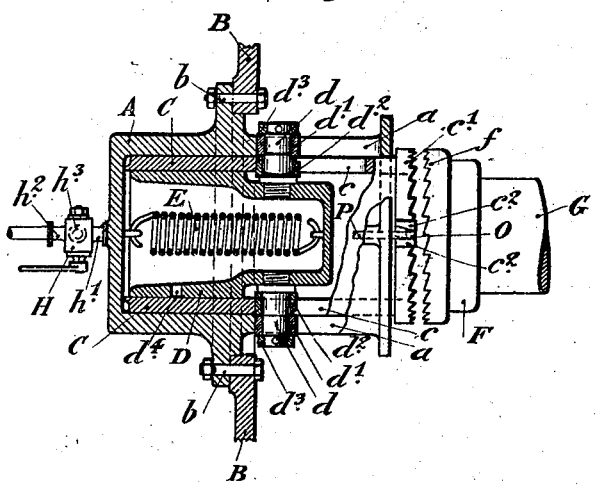
Fig. 2 is a horizontal section on the line II—II of Fig. 1.

In the cylinder A is mounted a sleeve C carrying one of the elements of the ratchet gear and surrounding the actuating piston D which receives from an opposing spring E a constant tendency to remain in the inoperative position it is shown occupying in Figs. 1 and 2. The piston is hollow, being closed at one end and open at the other opposite to the head of the cylinder.

The piston D is provided with two tenons or pins $d$ each furnished with two rollers $d^1$ $d^2$ held in place by pinned washers or nuts $d^3$. The rollers $d^1$ are engaged in slots $a$ formed in the cylinder A along two diametrically opposite genetratrices. The rollers $d^2$ are engaged in diametrically opposite helical slots $c$ formed in the sleeve C.

The ratchet gear for actuating the shaft to be rotated comprises an element such as teeth $c^1$ formed on the end or face of the sleeve C and designed to come into engagement with teeth $f$ that constitute the complementary element of the said gear. These teeth $f$ may be formed on a disk or collar F mounted on the end of the shaft G to be rotated.

The pressure fluid is admitted into the cylinder A by the operation of a three-way cock H. One branch, $h^1$, of the casing of this cock communicates with the interior of the cylinder A through the head thereof, a second branch $h^2$ is connected to the supply of the fluid, and the third branch $h^3$ is connected to an exhaust pipe I.

Figure 5:
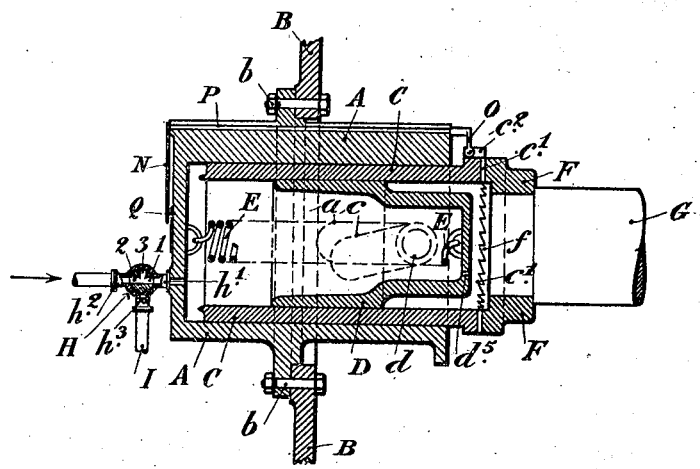
Fig. 5 is a vertical longitudinal section similar to Fig. 1, but showing the parts in a position of engagement.
Figures 3, 4:
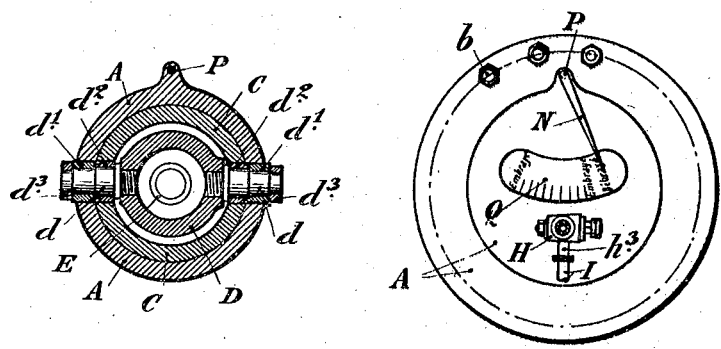
Fig. 3 is a cross section on the line III—III of Fig. 1.
Fig. 4 is an end view taken from the line IV—IV of Fig. 1.
Figure 6:
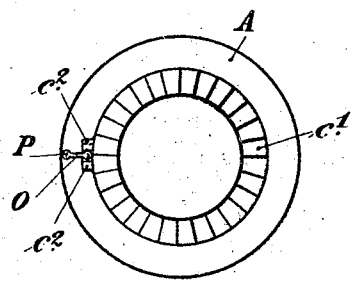
Fig. 6 is an end view taken from the line VI—VI of Fig. 1.

On moving the plug of the cock H into the position shown in Fig. 5, wherein communication is established through the ports 2 and 1 between the pipes $h^1$ and $h^2$, the pressure fluid is admitted into the cylinder A. By this means the sleeve C and the piston D are moved toward the shaft G.

Since the sleeve C has no resistance to overcome, it will follow the movement of the piston D which latter in its advance has to overcome the action of the spring E. The teeth $c^1$ of the sleeve C come in contact with the teeth $f$ of the collar F on the shaft G.

The advance of the piston D causes the rollers $d^1$ and $d^2$ to roll respectively along the sides of the slots $a$ and $c$, and owing to the helical form of the slots $c$ the sleeve C will be caused to rotate on its own axis, and this rotational motion will be transmitted by the teeth $c^1$ and $f$ to the shaft G to be rotated.

The proportion between the stroke of the piston D and the rotational movement of the movable sleeve C, depends on the effort to be exerted upon the teeth $c^1$ and $f$, and the available pressure of the motive fluid.

The improved apparatus must be so designed as to insure that the complete single stroke of the piston D shall rotate the collar F through an angle corresponding to the pitch of the teeth $c^1$ and $f$, so that in order to rotate the said collar through a complete revolution, the piston will have to make as many complete double (to-and-fro) strokes as there are teeth on the collar F.

When the sleeve C is pushed by the pressure fluid it may happen that the teeth $c^1$ and $f$ do not engage together immediately; they will however become completely engaged within a portion of the rotation of the sleeve.

When the piston D arrives at the end of its forward stroke (Fig. 5), an orifice $d^4$ (Fig. 2) formed in its side comes opposite the slots $a$ and $c$, and the pressure fluid exhausts to the outside of the apparatus; this avoids any risk of over-pressure in cases where the pressure of the motive fluid is not limited.

In order to cause the apparatus to return into its inoperative or starting position shown in Figs. 1 and 2, it is sufficient to turn the three-way cock H through one-quarter of a revolution to the right so as to shut off the admission of the pressure fluid, and establish communication between the passages $h^1$ and $h^3$ by means of the ports 3 and 1 of the plug (Fig. 1). The piston D is moved back by the spring E, and by this means the sleeve is rotated in the reverse direction to its previous rotation, with the result that the teeth $c^v$ and $f$ are forced to unmesh by slipping over their inclined faces. Before the end of its return stroke the piston D moves the movable sleeve C back with it so as to disengage the teeth $c^1$ completely from the teeth $f$.

The casing A, the hollow piston D and the interposed sleeve C form a telescopic chamber of comparatively large volumetric capacity, considering the restricted size of the port $h^1$ supplying fluid-pressure to said chamber. Furthermore, the capacity of the chamber progressively increases as the hollow piston moves away from the cylinder head. Consequently, there must be considerable expansion of the fluid-pressure entering the chamber before and during the movement of the piston and with a resulting slow movement of the same together with the sleeve. As the piston advances it carries with it the sleeve, owing to the frictional contact of the engaged sides of said members, and also to the camming action of the pins $d$ through their rollers $d^2$ bearing on the curved sides of helical slots $c$ in the sleeve. Furthermore, when the inner end of the sleeve separates from the cylinder head the fluid-pressure becomes effective, to some extent, on such end to advance the sleeve.

With the resulting slow advance of the piston the sleeve is slowly rotated through the camming action of the pins $d$ and their rollers $d^2$ in the helical slots $c$ of the sleeve, the piston being guided to travel rectilinearly by the engagement of the rollers $d^1$ of the pins $d$ in the longitudinal slots $a$ of the casing. The advance of the sleeve engages the ratchet members $c^1$ and $f$, and the slow rotation of the sleeve is imparted to the shaft G through a fraction of a revolution. As there is but a single advance of the piston and sleeve for each admission of fluid-pressure to the telescopic chamber, and as the fluid-pressure supply pipe is manually controlled, not only can there be secured a slow turning of the shaft for a partial revolution, but the intervals between the turnings can be regulated to meet the requirements of inspection and repair.

The three-way cock may be replaced by a slide valve distributer.

Figure 7:
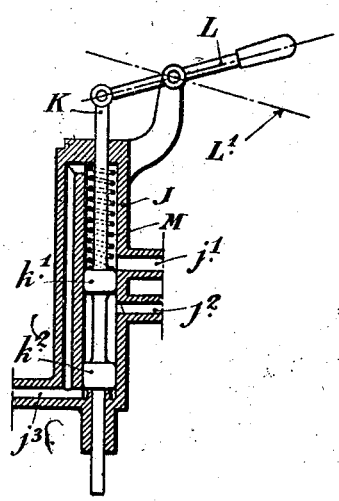
Fig. 7 is a vertical section on a larger scale of a modified form of the pressure fluid distributer.

Fig. 7 is a longitudinal section of a distributor of this kind. This distributer comprises a distributer casing J in which slides a piston valve K having two heads $k^1$, $k^2$. The motive pressure fluid is supplied to the valve through the branch $j^2$. Communication between the valve and the barring apparatus proper is established through the branch $j^1$. The pressure fluid is exhausted through the pipe branch $j^3$. The valve is operated by means of a handlever L. A spring M has a constant tendency to keep the valve in position of exhaust as shown in Fig. 7.

To admit the pressure fluid into the barring apparatus, it is merely necessary to press the handlever L down into the position L¹ indicated by the dot-and-dash line, so as to lift the valve, and thus establish communication between the branches $j^1$ and $j^2$.

To exhaust the pressure fluid from the barring apparatus, it is sufficient to release the handlever L, whereupon the spring M will move the valve K back into the position shown in Fig. 7, so as to establish communication between the branches $j^1$ and $j^3$.

The fluid pressure upon the two heads $k^1$ and $k^2$ are in equilibrium at all times. The necessity of keeping the handlever L by hand in the position for admitting the motive fluid in the apparatus will prevent any untimely admission of the said fluid.

A small orifice $d^5$ formed in the end of the piston D would assure more slowly the exhaust of the motive fluid from the apparatus in case the cock or the valve should become choked accidentally.

N is a pointer receiving its movement from the sleeve C by means of two cogs $c^2$ having inclined faces, formed on the said sleeve, and arranged to drive by contact a lever O which produces a rotational movement in the cylinder, of a shaft P that carries the said pointer.

The pointer N thus indicates exactly the various positions of the sleeve C. Q is a scale from which the said positions can be read, amplified in the proportion of the length of the pointer N to the length of the lever O.

Although situated preferably at one end of the shaft to be rotated, the improved barring apparatus may be mounted at any other point and be adapted to operate through connecting gear, and it may be employed in all cases where rotary parts require to be barred.

What I claim is:—

1. In barring apparatus, a shaft having a ratchet member fixed thereon, a cylindrical casing having a restricted port at one end to admit fluid-pressure to the interior of the same, a piston reciprocative in the casing and constituting with the same a telescopic chamber of large capacity, as compared with the admission port, for the expansion of the fluid-pressure therein to effect a slow advance of the piston, a sleeve reciprocative between the casing and the piston and having a ratchet member complementary to and normally separated from the ratchet member fixed on the shaft, and a tenon on the piston having sliding engagements with a helical slot in the sleeve and a longitudinal slot in the cylindrical casing so that the advance of the piston will impart a slowly rotative advance to the sleeve to engage the complementary ratchet members to turn slowly the shaft through a partial revolution.

2. In barring apparatus, a shaft having a ratchet member fixed thereon, a cylindrical casing open at one end and closed at the other by a head having a restricted port to admit fluid-pressure to the interior of the casing, a hollow piston reciprocative in the casing closed at one end and open at the other opposite to the head of the cylinder, said piston constituting with the casing a telescopic chamber of large capacity, as compared with the admission port, for the expansion therein of the fluid-pressure to effect a slow advance of the piston, a sleeve reciprocative between the casing and the piston and having a ratchet member complementary to and normally separated from the ratchet member fixed on the shaft, and a tenon on the piston having sliding engagements with a helical slot in the sleeve and a longitudinal slot in the cylindrical casing so that the advance at the piston will impart a slowly rotative advance to the sleeve to engage the complementary ratchet members to turn slowly the shaft through a partial revolution.

3. In barring apparatus, a shaft having a ratchet member fixed thereon, a cylindrical casing open at one end and closed at the other by a head having a restricted port to admit fluid-pressure to the interior of the casing, a sleeve reciprocative in the casing having a ratchet member complementary to and normally separated from the ratchet member fixed on the shaft, a hollow piston reciprocative in the sleeve closed at one end and open at the other opposite to the head of the cylinder, said casing, sleeve and hollow piston constituting a telescopic chamber of large capacity, as compared with the admission port, for the expansion therein of the fluid-pressure to effect a slow advance of the piston, and a tenon on the piston having sliding engagements with a helical slot in the sleeve and a longitudinal slot in the cylindrical casing so that the advance of the piston will impart a slowly rotative advance to the sleeve to engage the complementary ratchet members to turn slowly the shaft through a partial revolution.

4. In barring apparatus, a shaft having a ratchet member fixed thereon, a cylindrical casing open at one end and closed at the other by a head having a restricted port to admit fluid-pressure to the interior of the casing, a sleeve reciprocative in the casing having a ratchet member complementary to and normally separated from the ratchet member fixed on the shaft, a hollow piston reciprocative in the sleeve closed at one end and open at the other opposite to the head of the cylinder, a spring in the hollow piston connecting the latter with the cylinder head to press normally the piston against said head, said casing, sleeve and hollow piston constituting a telescopic chamber of large capacity, as compared with the admission port, for the expansion therein of the fluid-pressure to effect a slow advance of the piston against the action of the spring, and a tenon on the piston having sliding engagements with a helical slot in the sleeve and a longitudinal slot in the cylindrical casing so that the advance of the piston will impart a slowly rotative advance to the sleeve to engage the complementary ratchet members to turn slowly the shaft through a partial revolution, the return movement of the piston through the action of the spring on release of the fluid-pressure operating to retract the sleeve to its initial position and to separate the ratchet members.

5. In barring apparatus, a shaft having a ratchet member fixed thereon, a cylindrical casing open at one end and closed at the other by a head having a restricted port to admit fluid-pressure to the interior of the casing, a sleeve reciprocative in the casing having a ratchet member complementary to and normally separated from the ratchet member fixed on the shaft, a hollow piston reciprocative in the sleeve closed at one end and open at the other opposite to the head of the cylinder, said casing, sleeve and hollow piston constituting a telescopic chamber of large capacity, as compared with the admission port, for the expansion therein of the fluid-pressure to effect a slow advance of the piston, and a tenon on the piston having sliding engagements with a helical slot in the sleeve and a longitudinal slot in the cylindrical casing so that the advance of the piston will impart a slowly rotative advance to the sleeve to engage the complementary ratchet members to turn slowly the shaft through a partial rotation, said piston having a safety port in its head to permit the escape of excessive fluid-pressure from the telescopic chamber and said piston having a port in its side to register with the slots in the sleeve and casing when the piston reaches the outer limit of its movement to release the fluid-pressure from the chamber when the piston reaches the outward limit of its movement.

In testimony whereof I have signed this specification.

EUGÈNE SCHNEIDER.